(12) United States Patent
Ammirati et al.

(10) Patent No.: US 9,796,401 B1
(45) Date of Patent: Oct. 24, 2017

(54) MOTORIZED WHEEL ACCESSORY FOR A STROLLER

(71) Applicants: Michael Ammirati, White Plains, NY (US); Michelle Ammirati, White Plains, NY (US)

(72) Inventors: Michael Ammirati, White Plains, NY (US); Michelle Ammirati, White Plains, NY (US)

( * ) Notice: Subject to any disclaimer, the term of this patent is extended or adjusted under 35 U.S.C. 154(b) by 0 days.

(21) Appl. No.: 15/340,227

(22) Filed: Nov. 1, 2016

(51) Int. Cl.
*B62B 5/00* (2006.01)
*A61G 5/04* (2013.01)

(52) U.S. Cl.
CPC ............ *B62B 5/005* (2013.01); *B62B 5/0046* (2013.01); *B62B 5/0053* (2013.01); *A61G 5/047* (2013.01); *B60Y 2200/83* (2013.01); *B60Y 2400/112* (2013.01); *B60Y 2400/60* (2013.01); *B60Y 2410/115* (2013.01); *B62B 2301/05* (2013.01)

(58) Field of Classification Search
CPC ..... B62B 5/0046; B62B 5/005; B62B 5/0053; A61G 5/047
See application file for complete search history.

(56) References Cited

U.S. PATENT DOCUMENTS

| | | | | |
|---|---|---|---|---|
| 2,448,992 A * | 9/1948 | Love | ...................... | A61G 5/047 180/13 |
| 2,495,573 A * | 1/1950 | Duke | ...................... | A61G 5/047 180/11 |
| 2,978,053 A * | 4/1961 | Schmidt | ................ | A61G 5/1051 180/12 |
| 2,993,550 A * | 7/1961 | Klappert | ................ | A61G 5/047 180/15 |
| 3,199,621 A * | 8/1965 | Seaman | ................... | B60K 1/00 180/11 |
| 3,330,371 A * | 7/1967 | Seaman | ................... | B60K 1/00 180/11 |
| 3,564,626 A * | 2/1971 | Nelson | ..................... | B62B 9/22 280/31 |
| 3,905,437 A * | 9/1975 | Kaiho | ..................... | A61G 5/047 180/15 |
| 4,199,036 A * | 4/1980 | Wereb | .................... | A61G 5/045 180/6.5 |
| 4,620,603 A * | 11/1986 | Reeves | ................ | B62D 51/008 180/19.1 |
| 5,113,959 A * | 5/1992 | Mastov | .................. | A61G 5/047 180/11 |

(Continued)

FOREIGN PATENT DOCUMENTS

| | | | | |
|---|---|---|---|---|
| DE | 19935506 A1 * | 2/2001 | ............ | A61G 5/047 |
| WO | 2009031145 A2 | 3/2009 | | |

*Primary Examiner* — Joseph M Rocca
*Assistant Examiner* — Maurice L Williams
(74) *Attorney, Agent, or Firm* — Kyle A. Fletcher, Esq.

(57) ABSTRACT

The motorized wheel accessory for a stroller is an aftermarket device that is configured to interface with a stroller in order to mobilize the stroller without the need for an end user to actually push said stroller. The motorized wheel accessory includes a frame that is configured to attach onto a rear axle of a stroller. The frame includes a power member that is wired to a motor. The motor is in mechanical connection with a pair of wheels. The pair of wheels propel the stroller. The frame may be adjustable to accommodate differently-sized strollers.

10 Claims, 5 Drawing Sheets

(56) References Cited

U.S. PATENT DOCUMENTS

| | | | | | |
|---|---|---|---|---|---|
| 5,135,063 | A * | 8/1992 | Kropf | | A61G 5/047 180/13 |
| 5,222,567 | A * | 6/1993 | Broadhead | | A61G 5/047 180/15 |
| 5,572,903 | A * | 11/1996 | Lee | | A47D 9/04 180/166 |
| 5,762,154 | A * | 6/1998 | Hsu | | A61G 5/047 180/15 |
| 6,220,379 | B1 * | 4/2001 | Schugt | | B62D 39/00 180/65.1 |
| 6,360,836 | B1 * | 3/2002 | Milano, Jr. | | B62B 5/005 180/65.6 |
| 6,481,514 | B2 * | 11/2002 | Takada | | A61G 5/047 180/11 |
| 6,588,527 | B2 * | 7/2003 | Lerner | | B62B 9/185 180/166 |
| 6,860,347 | B2 * | 3/2005 | Sinclair | | A61G 5/047 180/11 |
| 7,219,754 | B2 * | 5/2007 | Johnson | | A61G 7/08 180/19.2 |
| 7,735,587 | B1 * | 6/2010 | Stahlnecker | | B62B 1/12 180/11 |
| 7,971,885 | B2 * | 7/2011 | Sanders | | B62B 9/22 180/166 |
| 9,474,665 | B1 * | 10/2016 | Chan | | A61G 5/047 |
| 2002/0148657 | A1 * | 10/2002 | Tyson | | B62B 5/0026 180/65.1 |
| 2009/0064410 | A1 * | 3/2009 | Cohen | | A47D 9/02 5/109 |
| 2009/0205882 | A1 * | 8/2009 | Smith | | B62B 5/005 180/14.6 |
| 2009/0308672 | A1 * | 12/2009 | Soldatos | | A61G 5/045 180/65.1 |
| 2010/0012404 | A1 * | 1/2010 | Chiu | | A61G 5/047 180/65.1 |
| 2010/0038154 | A1 * | 2/2010 | March | | A61G 5/02 180/14.1 |
| 2010/0300777 | A1 * | 12/2010 | Tallino | | A61G 5/047 180/12 |
| 2011/0304121 | A1 * | 12/2011 | Chiu | | A61G 5/047 280/304.1 |
| 2011/0308880 | A1 * | 12/2011 | Chiu | | A61G 5/047 180/312 |
| 2012/0080243 | A1 * | 4/2012 | Mulhern | | A61G 5/047 180/11 |
| 2012/0279789 | A1 * | 11/2012 | Brill | | A61G 5/047 180/6.5 |
| 2013/0008732 | A1 * | 1/2013 | Richter | | A61G 5/04 180/167 |
| 2013/0240271 | A1 * | 9/2013 | Tallino | | A61G 5/047 180/11 |
| 2016/0136019 | A1 * | 5/2016 | Studebaker | | A61G 5/047 180/11 |
| 2016/0242977 | A1 * | 8/2016 | Richter | | A61G 5/047 |

* cited by examiner

US 9,796,401 B1

MOTORIZED WHEEL ACCESSORY FOR A STROLLER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of baby strollers and carriages, more specifically, a motorized accessory that aids in propelling the stroller.

SUMMARY OF INVENTION

The motorized wheel accessory for a stroller is an aftermarket device that is configured to interface with a stroller in order to mobilize the stroller without the need for an end user to actually push said stroller. The motorized wheel accessory includes a frame that is configured to attach onto a rear axle of a stroller. The frame includes a power member that is wired to a motor. The motor is in mechanical connection with a pair of wheels. The pair of wheels propel the stroller. The frame may be adjustable to accommodate differently-sized strollers.

An object of the invention is to provide a device that is configured to interface with a stroller in order to propel said stroller without the need for manual intervention of an adult parent or guardian.

A further object of the invention is to provide a device with a low center of gravity, and which is configured to interface with the stroller at a low position so as to abate any potential for the stroller to fall over.

These together with additional objects, features and advantages of the motorized wheel accessory for a stroller will be readily apparent to those of ordinary skill in the art upon reading the following detailed description of the presently preferred, but nonetheless illustrative, embodiments when taken in conjunction with the accompanying drawings.

In this respect, before explaining the current embodiments of the motorized wheel accessory for a stroller in detail, it is to be understood that the motorized wheel accessory for a stroller is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the motorized wheel accessory for a stroller.

It is therefore important that the claims be regarded as including such equivalent construction insofar as they do not depart from the spirit and scope of the motorized wheel accessory for a stroller. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
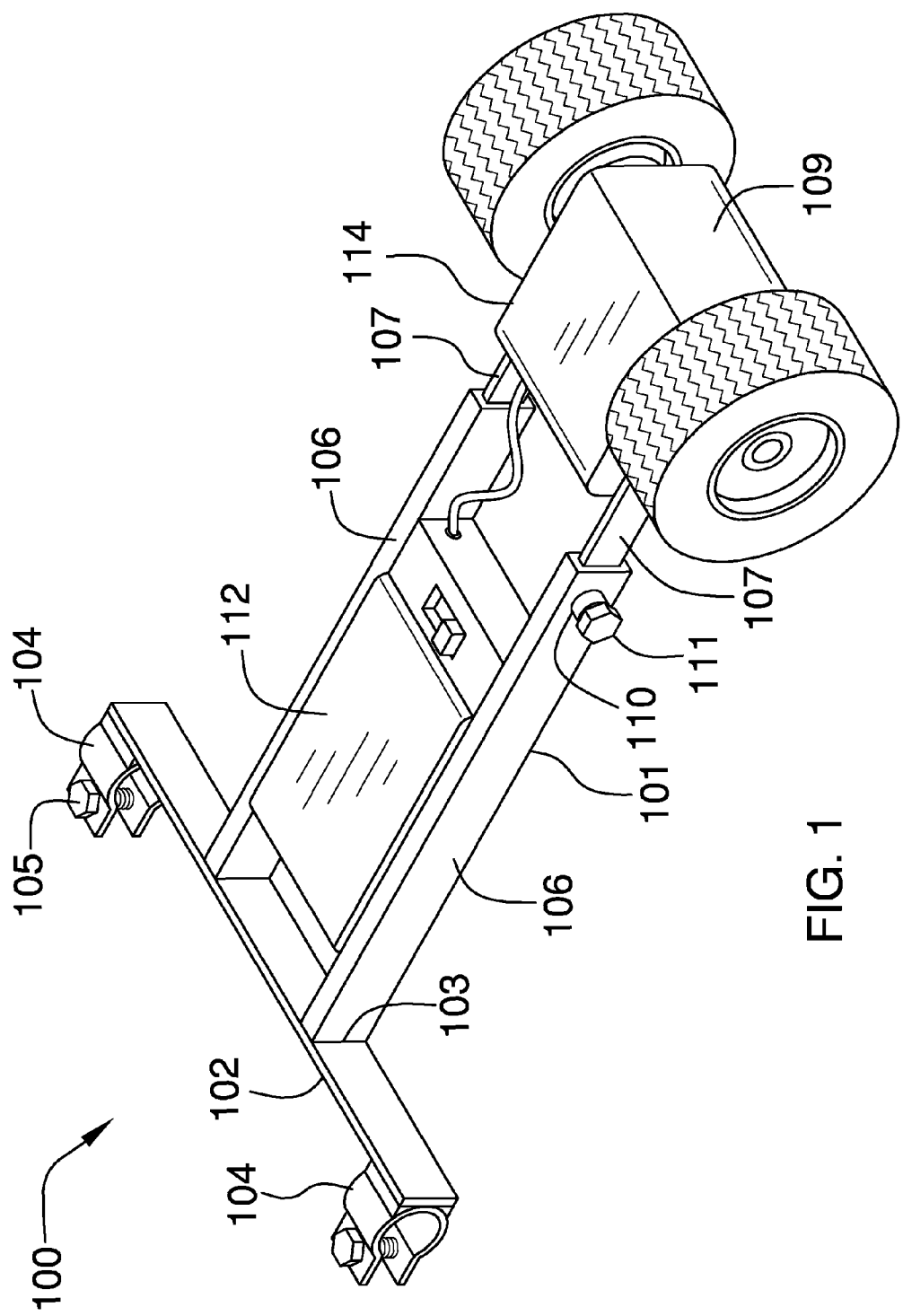
FIG. 1 is a perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The motorized wheel accessory for a stroller 100 (hereinafter invention) comprises a frame 101. The frame 101 includes a lateral member 102 at a front distal end 103 of the frame 101. The lateral member 102 includes a pair of clamp members 104. The pair of clamp members 104 is configured to the axle 201 of the stroller 200 is located at a rear end 205 of the stroller 200, and involves the rear stroller wheels 202.

The pair of clamp members 104 are commercially available items. The pair of clamp members 104 involve pipe clamps that include a tightening bolt 105 to secure the one of the pair of clamp members 104 onto the axle 201. The lateral member 102 is generally parallel with the axle 201 of the stroller 200. The pair of clamp members 104 are perpendicular with and extend forward of the lateral member 102.

The frame 101 may be further defined with a pair of first frame armatures 106 that each telescope with respect to a pair of second frame armatures 107. The telescoping function of the frame 101 enables a frame length 108 to be adjustable. The frame length 108 spans from the front distal end 103 to a rear distal end 109. The pair of first frame armatures 106 is parallel with one another. The pair of second frame armatures 107 is parallel with one another. Each one of the pair of second frame armatures 107 extends in and out of a respective one of the pair of first frame armatures 106.

Each one of the pair of first frame armatures 106 includes an adjustment collar 110 that supports an adjustment screw 111. The adjustment screw 111 is threaded, and screws in and out of the adjustment collar 110 in order to tighten or loosen the one respective one of the pair of second frame armatures 107. The adjustment screw 111 provides means for adjusting the frame length 108. Both the adjustment collar 110 and the adjustment screw 111 are positioned aside of the respective one of the pair of first frame armatures 106 such that the adjustment screw 111 is accessible from aside of the frame 101.

Situated between the pair of first frame armatures 106 is a power member 112. The power member 112 is a glorified term for at least one battery. The power member 112 is ideally rechargeable, and provides electricity for a motor 113. The motor 113 is housed within a rear housing 114. The rear housing 114 is located between the pair of second frame armatures 107.

The power member 112 includes a first wire 115 that extends from the power member 112 to an on/off switch 116. The on/off switch 116 is located immediately adjacent to the power member 112. A second wire 117 extends from the on/off switch 116 to the motor 113. The second wire 117 has some play in length to accommodate the adjustment of the frame length 108.

Figure 2:
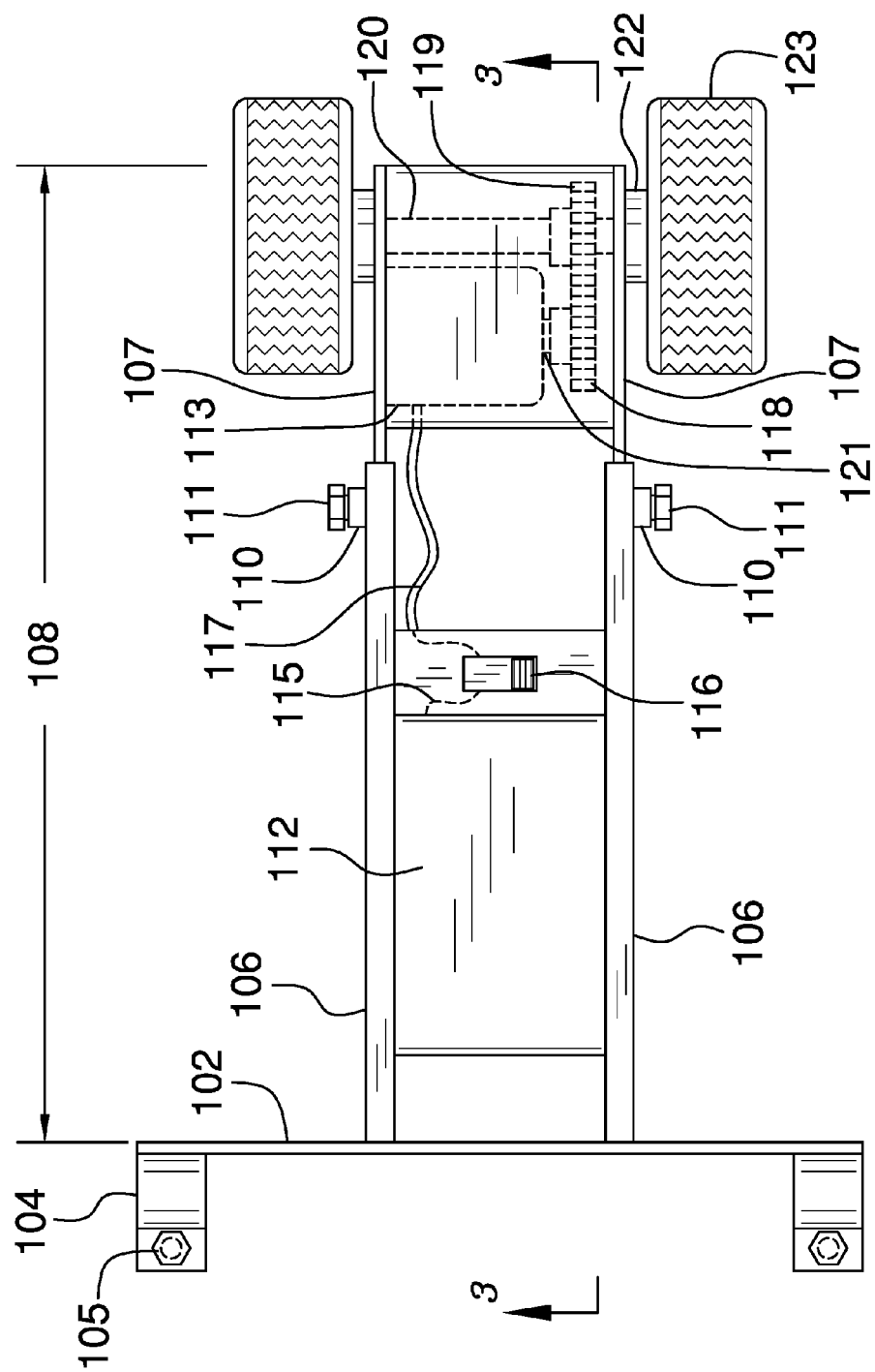
FIG. 2 is a top view of an embodiment of the disclosure.
Figure 3:
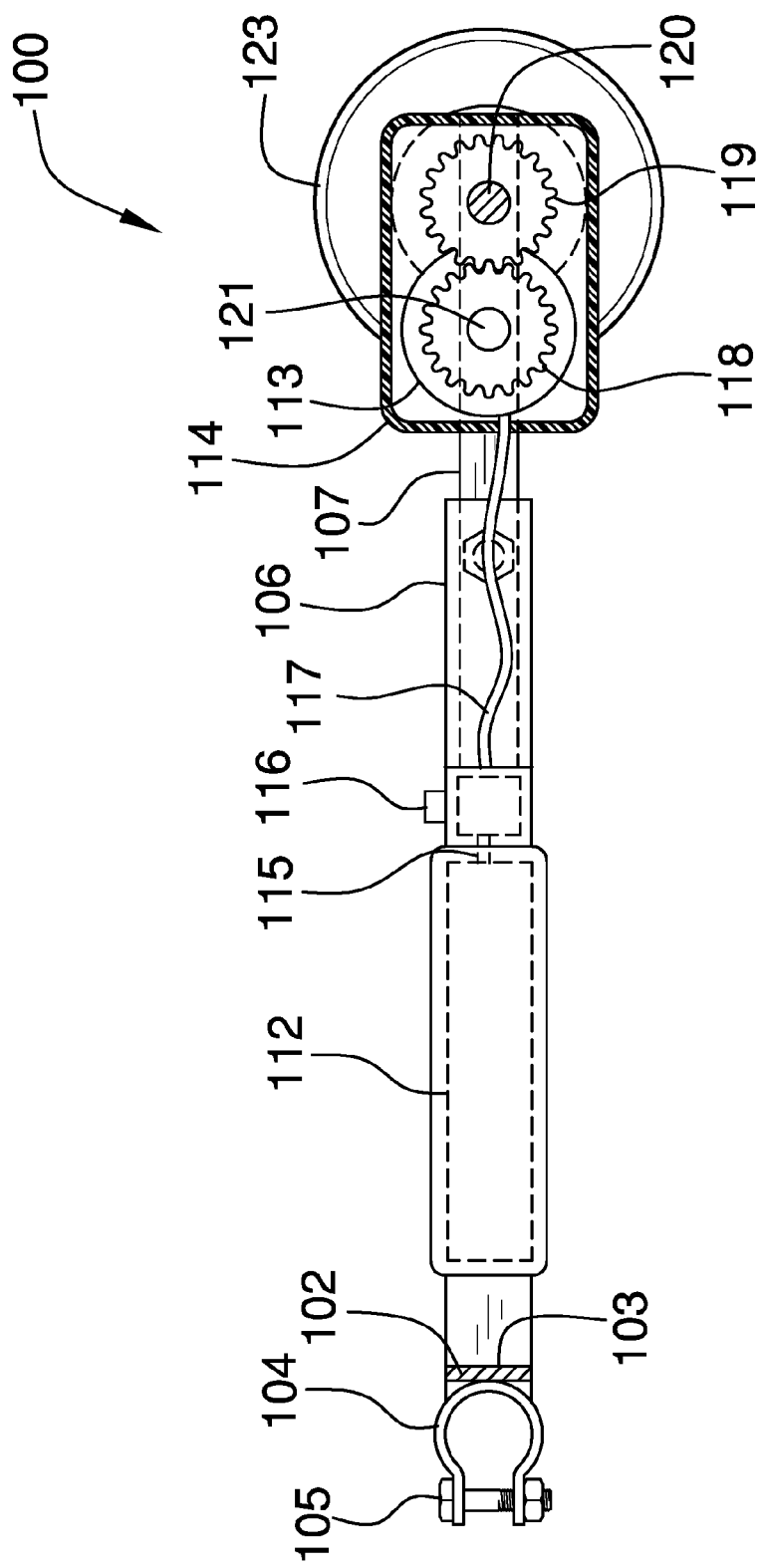
FIG. 3 is a cross-sectional view of an embodiment of the disclosure across line 3-3 in FIG. 2.

Referring to FIG. 2, the rear housing 114 houses the motor 113, a first gear 118, a second gear 119, and a wheel axle 120. The motor 113 includes a drive shaft 121 that is affixed to the first gear 118. The first gear 118 is in mechanical connection with the second gear 119. The second gear 119 is wheel axle 120 via the first gear 118 and the second gear 119. The motor 113 is electrically-driven, and is a commercially available component. The first gear 118 and the second gear 119 are also commercially available components.

A pair of bearing members 122 interface between the wheel axle 120 and the pair of second frame armatures 107. The pair of bearing members 122 enable the wheel axle 120 to rotate relative the pair of second frame armatures 107. Moreover, the wheel axle 120 is affixed to a pair of wheels 123. The pair of wheels 123 and the wheel axle 120 rotate together. The pair of wheels 123 are provided on outer sides of the pair of second frame armatures 107.

Figure 4:
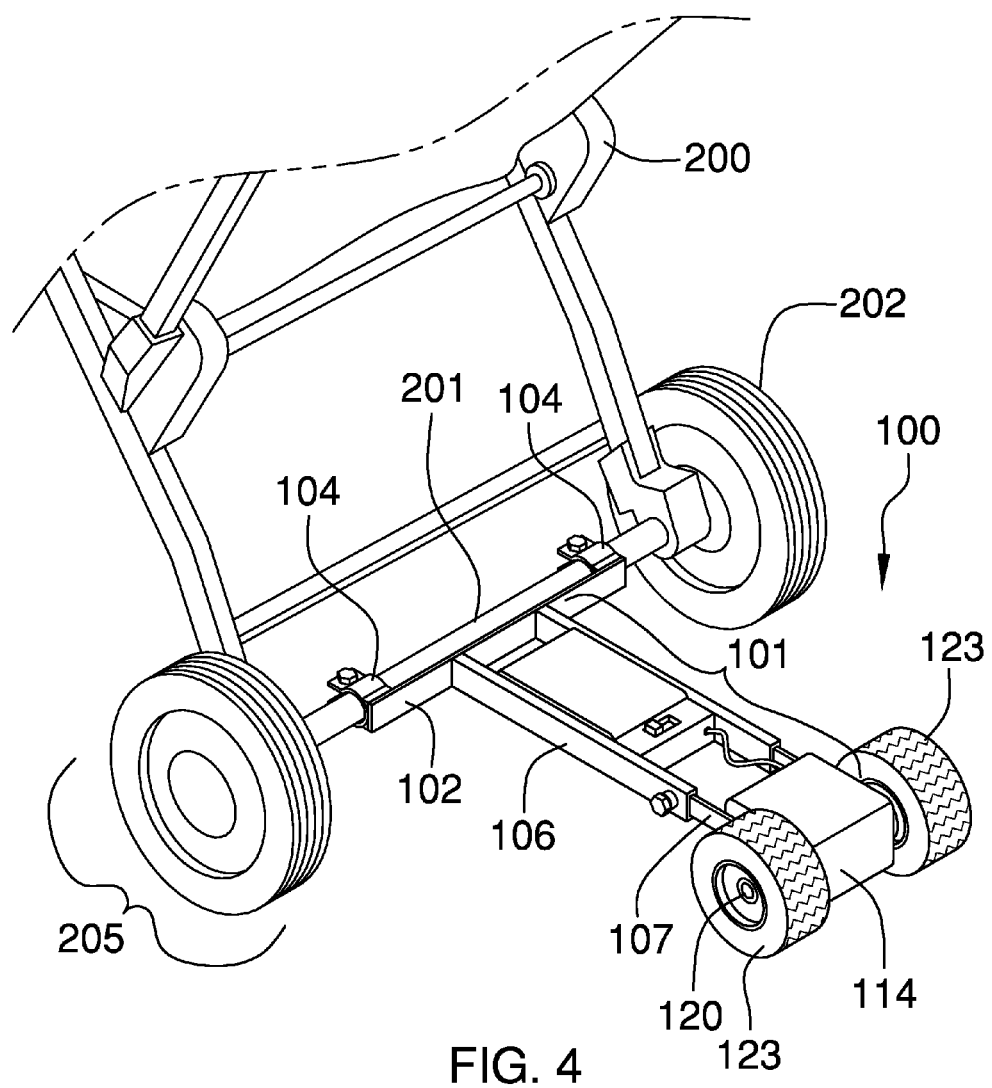
FIG. 4 is a perspective view of an embodiment of the disclosure in use.
Figure 5:
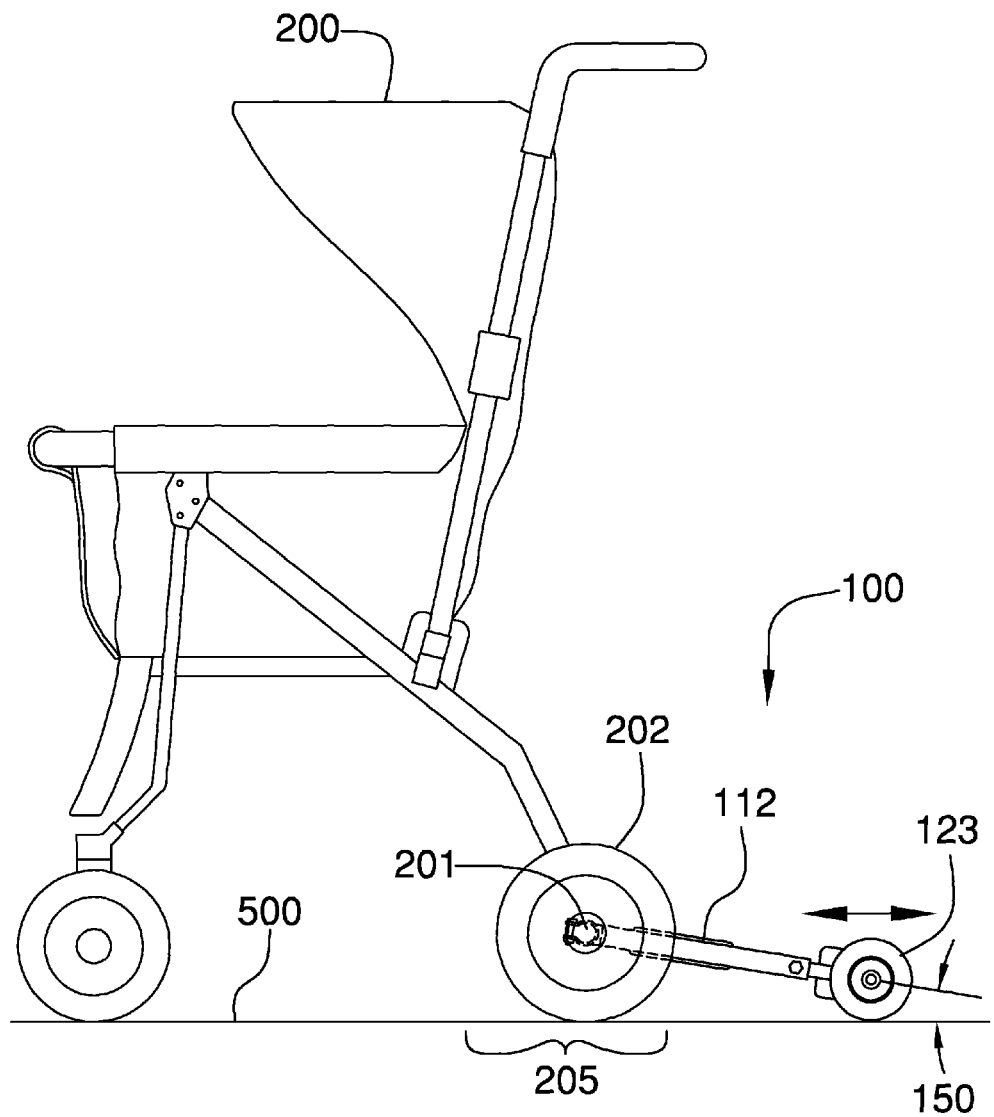
FIG. 5 is a side view of an embodiment of the disclosure in use.

Referring to FIGS. 4-5, the invention 100 is configured to be positioned behind the stroller 200 such that the pair of wheels 123 propel both the invention 100 and the stroller 200. The pair of wheels 123 are aligned with the rear wheels 202 if the stroller 200. It shall be noted that steering or directional adjustments of the stroller 200 may be required of an end user. The frame 101 enables the pair of wheels 123 to be positioned behind the rear wheels 202 of the stroller 200. Moreover, the frame 101 is angled downwardly at a declination angle 150. The declination angle 150 is formed between the frame 101 and a ground surface 500.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A motorized accessory comprising:
a frame from which a pair of clamp members is configured to attach to an axle of a stroller;
wherein the frame includes a motor that drives a pair of wheels such that the motorized accessory is configured to propel said stroller;
wherein the frame is further defined with a lateral member at a front distal end of the frame;
wherein the lateral member includes the pair of clamp members;
wherein the pair of clamp members is configured to interface with an axle of a rear end that involves rear stroller wheels of said stroller;
wherein the pair of clamp members are pipe clamps that include a tightening bolt to secure the one of the pair of clamp members onto the axle of the stroller;
wherein the lateral member is configured to be generally parallel with the axle of the stroller;
wherein the pair of clamp members are perpendicular with and extend forward of the lateral member;
wherein the frame is further defined with a pair of first frame armatures that each telescope with respect to a pair of second frame armatures;
wherein the telescoping function of the frame enables a frame length to be adjustable;
wherein the frame length spans from the front distal end to a rear distal end;
wherein the pair of first frame armatures is parallel with one another;
wherein the pair of second frame armatures is parallel with one another;
wherein each one of the pair of second frame armatures extends in and out of a respective one of the pair of first frame armatures;
wherein each one of the pair of first frame armatures includes an adjustment collar that supports an adjustment screw;
wherein the adjustment screw is threaded, and screws in and out of the adjustment collar in order to tighten or loosen the one of the pair of first frame armatures with respect to a respective one of the pair of second frame armatures;
wherein the adjustment screw enables the frame length to be adjusted;
wherein both the adjustment collar and the adjustment screw are positioned aside of the respective one of the pair of first frame armatures such that the adjustment screw is accessible from aside of the frame;
wherein situated in a space directly between the pair of first frame armatures is a power member;
wherein the power member is comprised of at least one battery.

2. The motorized accessory according to claim 1 wherein the at least one battery provides electricity for the motor; wherein the motor is housed within a rear housing.

3. The motorized accessory according to claim 2 wherein the rear housing is located between the pair of second frame armatures.

4. The motorized accessory according to claim 3 wherein the power member includes a first wire that extends from the power member to an on/off switch; wherein the on/off switch is located immediately adjacent to the power member.

5. The motorized accessory according to claim 4 wherein a second wire extends from the on/off switch to the motor.

6. The motorized accessory according to claim 5 wherein the rear housing houses the motor, a first gear, a second gear, and a wheel axle.

7. The motorized accessory according to claim 6 wherein the motor includes a drive shaft that is affixed to the first gear; wherein the first gear is in mechanical connection with the second gear; wherein the second gear is rigidly affixed to the wheel axle; wherein the motor rotates the wheel axle via the first gear and the second gear.

8. The motorized accessory according to claim 7 wherein a pair of bearing members interface between the wheel axle and the pair of second frame armatures; wherein the pair of bearing members enable the wheel axle to rotate relative the pair of second frame armatures; wherein the wheel axle is affixed to the pair of wheels; wherein the pair of wheels and the wheel axle rotate together; wherein the pair of wheels are provided on outer sides of the pair of second frame armatures.

9. The motorized accessory according to claim 8 wherein the motorized accessory is configured to be positioned behind the stroller such that the pair of wheels propel both the motorized accessory and the stroller; wherein the pair of wheels are aligned with the rear stroller wheels of the stroller.

10. The motorized accessory according to claim 9 wherein the frame enables the pair of wheels to be positioned behind the rear stroller wheels of the stroller; wherein the frame is angled downwardly at a declination angle; wherein the declination angle is formed between the frame and a ground surface.

\* \* \* \* \*